July 8, 1958 G. E. COATS 2,842,191
TIRE BEAD BREAKING APPARATUS
Filed April 18, 1955 6 Sheets-Sheet 3
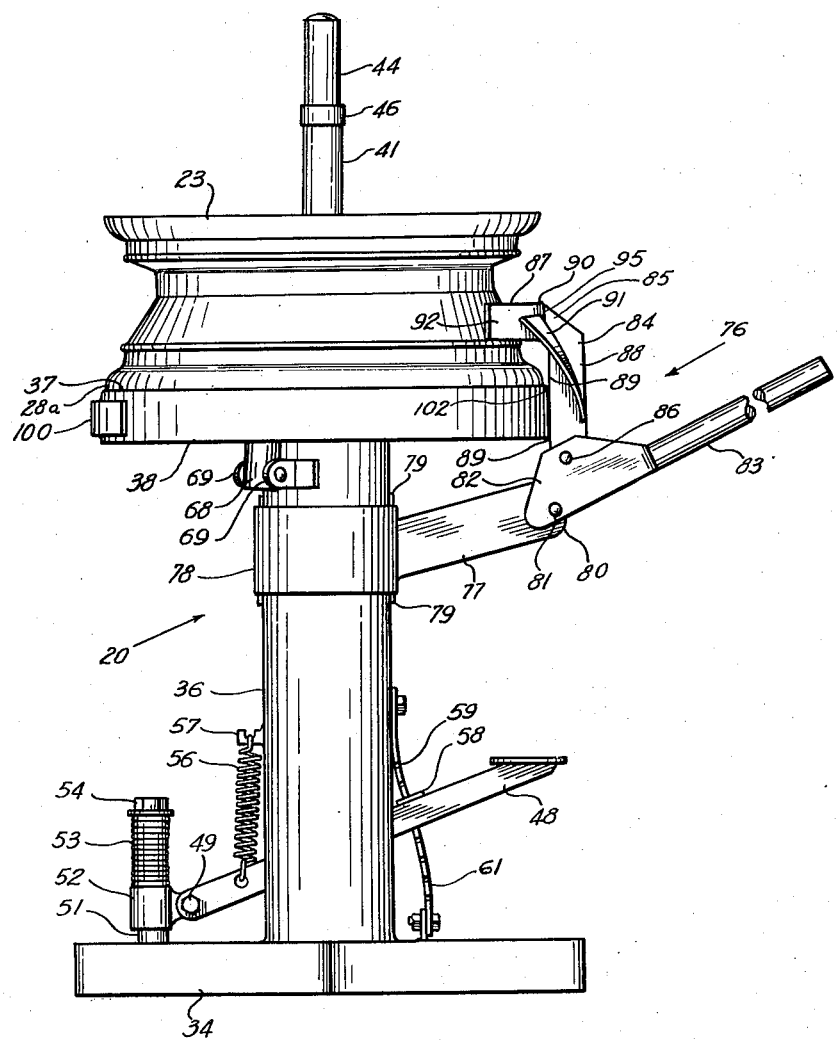
INVENTOR.
GILBERT E. COATS
BY
ATTORNEY.

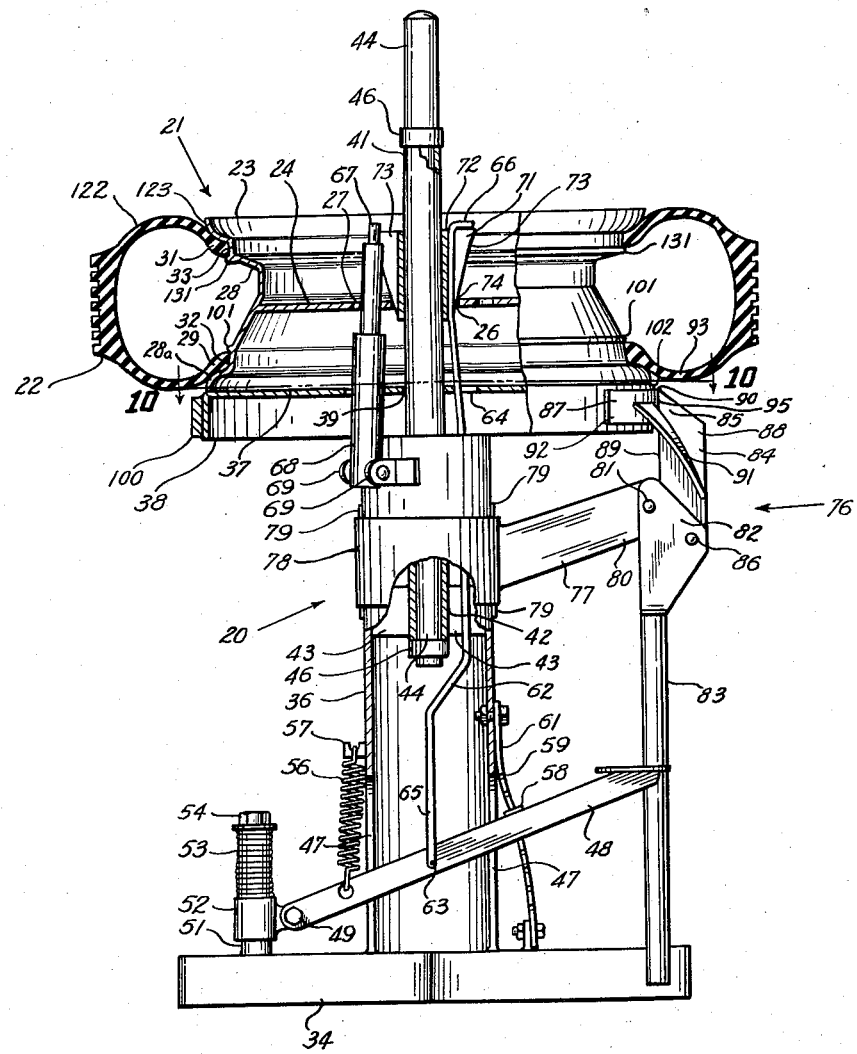

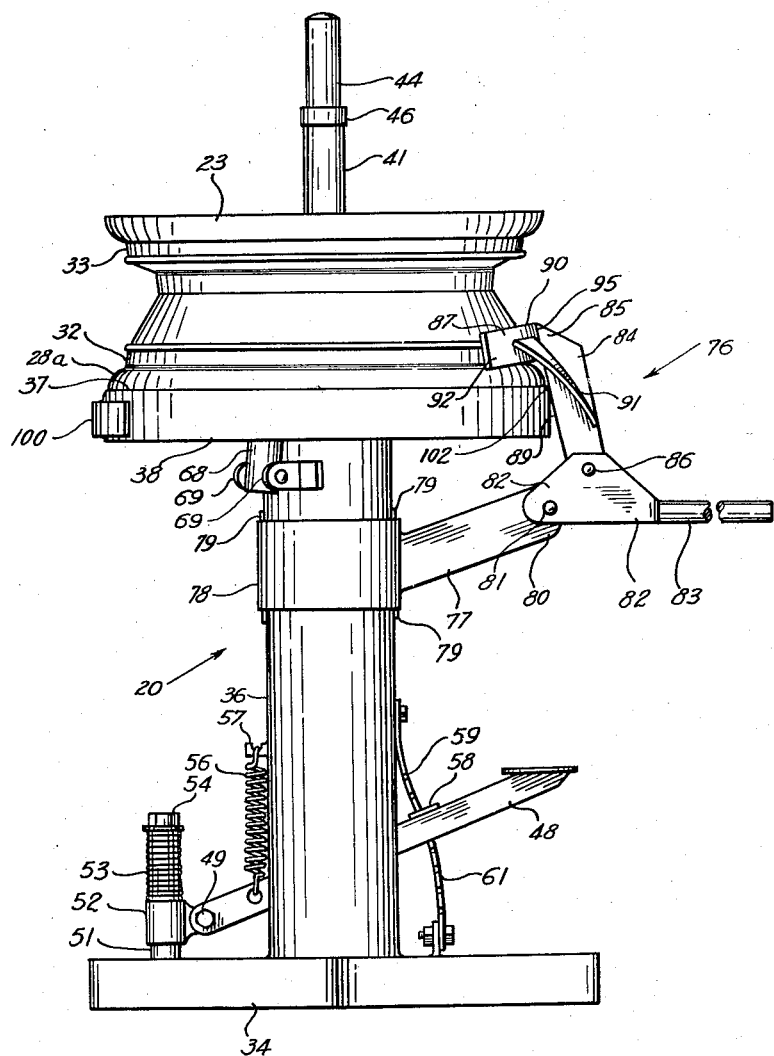

July 8, 1958

G. E. COATS 2,842,191

TIRE BEAD BREAKING APPARATUS

Filed April 18, 1955

INVENTOR.
GILBERT E. COATS
BY
ATTORNEY.

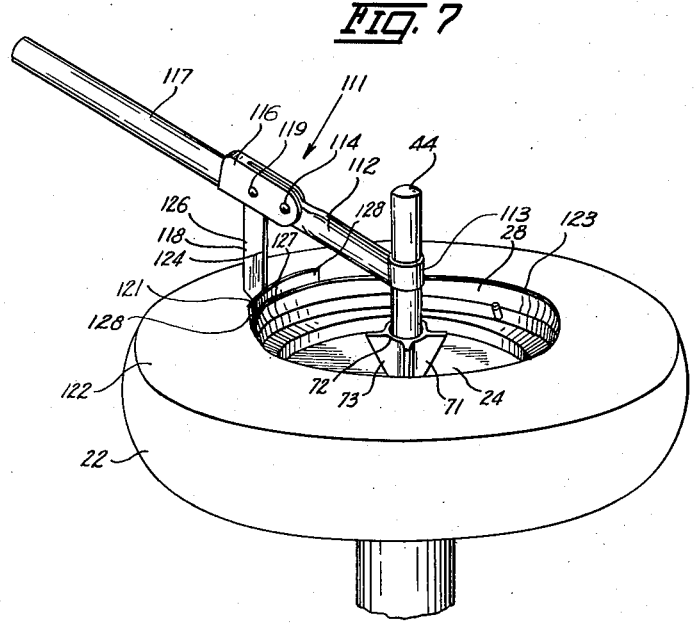

July 8, 1958
G. E. COATS
2,842,191
TIRE BEAD BREAKING APPARATUS
Filed April 18, 1955
6 Sheets-Sheet 6
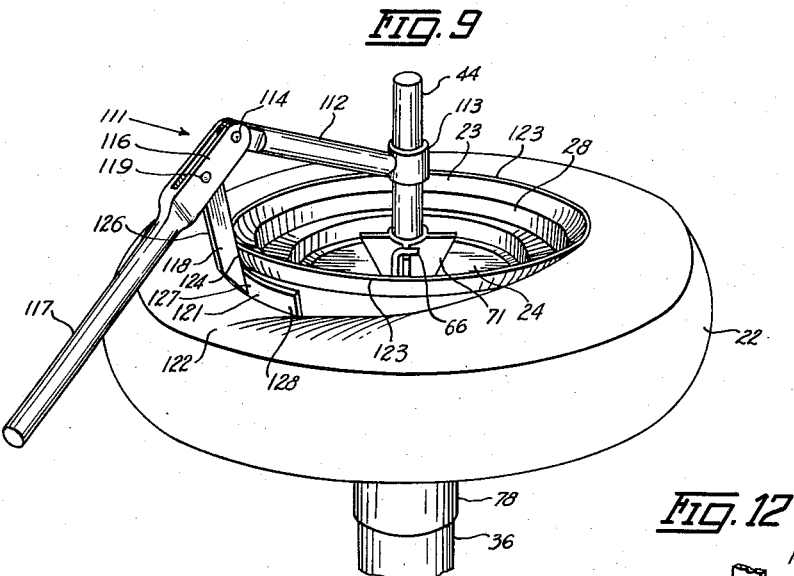
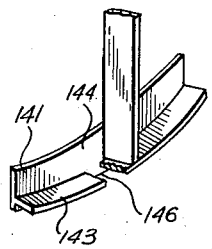
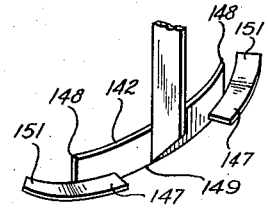
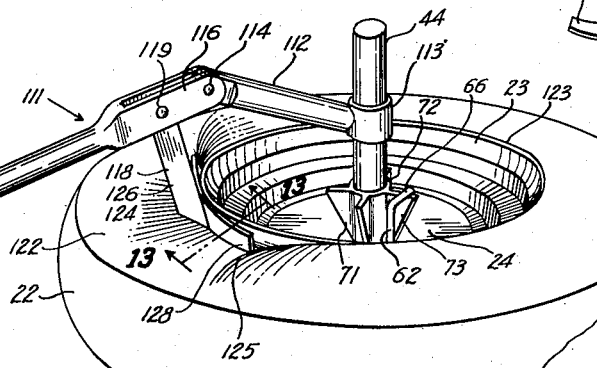
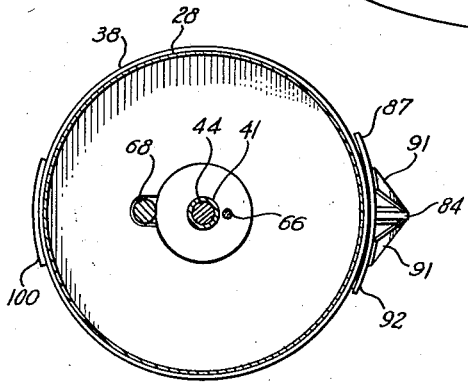
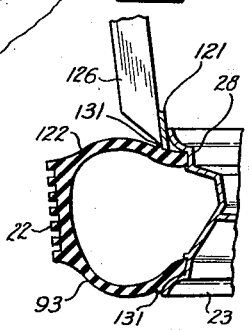
INVENTOR.
GILBERT E. COATS
BY *Rudolph L. Lowell*
ATTORNEY

United States Patent Office 2,842,191
Patented July 8, 1958

2,842,191

TIRE BEAD BREAKING APPARATUS

Gilbert E. Coats, Fort Dodge, Iowa

Application April 18, 1955, Serial No. 501,936

2 Claims. (Cl. 157—1.26)

This invention relates generally to tire dismounting apparatus and more particularly to a device for moving a bead of a pneumatic tire out of engagement with a complementary portion of the rim of a wheel for the tire.

An object of this invention, therefore, is to provide an improved device for moving the bead of a pneumatic tire out of engagement with a complementary portion of the rim of a wheel for the tire.

A further object of this invention is to provide a device for rolling the bead of a pneumatic tire out of engagement with a complementary portion of a wheel rim.

Another object of this invention is to provide a tire dismounting device which includes a curved shoe member engageable with a tire at a position adjacent the tire bead for rolling a substantial peripheral portion of the tire bead out of engagement with a complementary rim portion of the wheel for the tire, so that the remainder of the bead is easily manually moved out of engagement with its complementary rim portion.

A further object of this invention is to provide a tire dismounting device having a pivotally mounted tire engaging shoe unit which is guidably engaged with a tire side wall at a position adjacent the tire bead such that on guided movement of the shoe unit in a direction toward the tire, the bead is rolled out of engagement with a complementary wheel rim portion.

A still further object of this invention is to provide a tire dismounting device which is simple in construction, economical to manufacture, and efficient in operation to quickly and easily roll a bead of a pneumatic tire out of engagement with a complementary portion of a wheel rim.

Further objects, features and advantages of this invention will become apparent from a consideration of the following description, when taken in connection with the accompanying drawing in which:

Fig. 1 is a side elevational view of the tire dismounting device of this invention, shown in assembly relation with a tire and wheel assembly, and showing the device in an inoperative position, with some parts broken away and other parts shown in section for the purpose of clarity;

Fig. 2 is a side elevational view of the tire dismounting device of this invention, illustrated similarly to Fig. 1, but with the tire removed, and showing the tire engaging shoe member for the device moved upwardly to an intermediate position;

Fig. 3 is a side elevational view of the tire dismounting device of this invention, illustrated similarly to Fig. 2, and showing the tire engaging shoe for the device moved upwardly to a final position;

Figure 5:
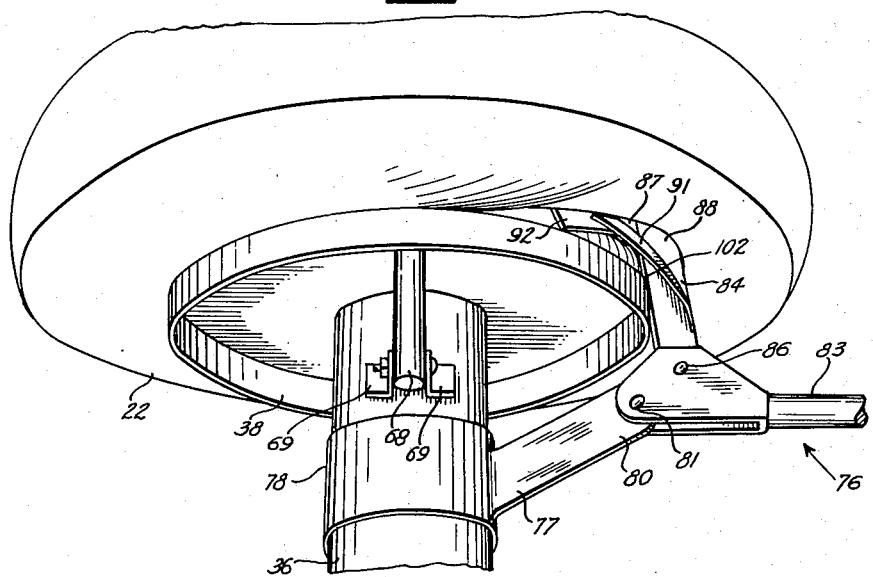
Figure 4:
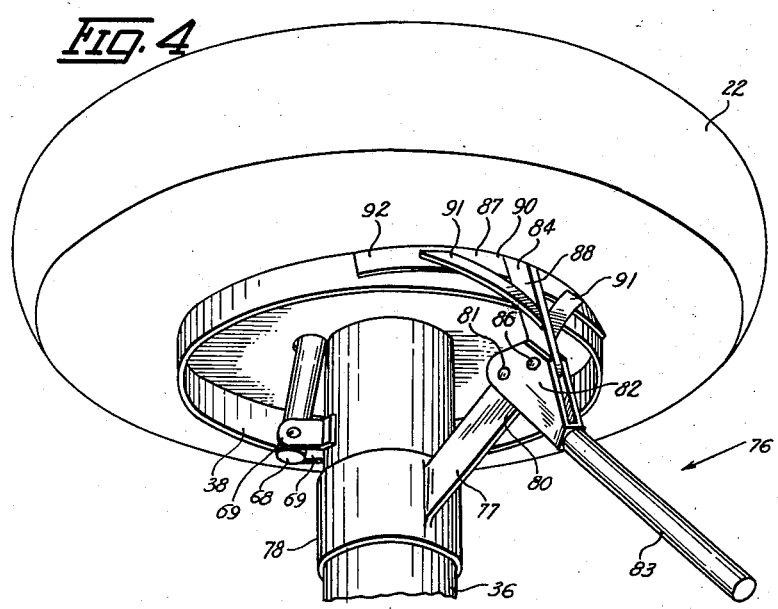

Figs. 4, 5, and 6 are fragmentary perspective views of the tire dismounting device of this invention, shown in assembly relation with a tire and a wheel assembly, with the positions of the shoe member corresponding substantially to the shoe member positions shown in Figs. 1, 2, and 3, respectively, and showing the action of the shoe member on a tire;

Fig. 7 is a fragmentary perspective view of the tire dismounting device of this invention, shown in assembly relation with a tire and wheel assembly, and showing a lever and shoe assembly, illustrated in an inoperative position, mounted on the device for moving the upper tire bead out of engagement with the complementary portion of the wheel rim;

Figs. 8 and 9 are fragmentary perspective views of the tire dismounting device of this invention and the upper lever and shoe assembly, illustrated similarly to Fig. 7, and showing progressively moved positions of the shoe member, with Fig. 8 showing an intermediate position of the shoe and Fig. 9 showing a fully moved or final position of the shoe;

Fig. 10 is a reduced sectional view of the tire dismounting apparatus of this invention, looking along the line 10—10 in Fig. 1;

Figs. 11 and 12 are fragmentary perspective views of modified forms of shoe units adapted for use in the tire dismounting device of this invention; and Fig. 13 is a fragmentary sectional view looking along the line 13—13 in Fig. 8.

With reference to the drawing, the tire dismounting device of this invention, indicated generally at 20, is shown in Fig. 1 in assembly relation with a tire and wheel assembly 21 which includes a pneumatic tire 22, of tubeless type, carried on a wheel 23, of drop-center type. The wheel 23 includes the usual body or hub portion 24 having a central opening 26, lug receiving appertures 27 arranged about the central opening 26, and a peripheral rim 28 of irregular shape. The tire beads 29 and 31 seat on complementary shaped portions 32 and 33, respectively, of the rim 28 in the assembly of the tire 22 with the wheel 23.

The tire dismounting device 20 includes a flat rectangular base 34 adapted to be supported on a floor surface and a central tubular standard or center post 36 secured to and projected upwardly from a central position on the base 34. Mounted on the upper end of the standard 36, in a concentric relation therewith, is a substantially horizontal circular wheel supporting table 37, provided with a peripheral downwardly extended flange 38.

Coaxially arranged in a spaced relation within the standard 36, and projected upwardly therefrom through a central opening 39 in the table 37, is a tubular bearing 41 the lower end 42 of which terminates at a position substantially midway between the opposite ends of the standard 36 (Fig. 1). The bearing 41 is supported in a fixed spaced relation within the standard 36 by the provision of wing or brace members 43 secured to and extended between the bearing 41 and the standard 36. Rotatably supported within the bearing 41 is an elongated post or bar 44, maintained against coaxial movement relative to the bearing 41 by means of stop collars 46 secured to opposite ends of the post 44 and adapted for abutting engagement with the corresponding opposite ends of the bearing 41.

It is seen, therefore, that the bearing 41 and the post 44 form an integral part of and constitute an upward extension of the standard 36, with the post 44 terminating at a position above the wheel and rim assembly 21.

The lower end of the tubular standard 36 is formed with a pair of oppositely arranged axially extended slots 47 (Fig. 1) for receiving a foot operated lever 48 having one end pivoted at 49 to a collar 52 floatingly carried on an upright bolt 51 secured to the base 34. The collar 52 is biased in a downward direction by the action of a coil spring 53 mounted about the bolt 51 and arranged in compression between the bolt head 54 and the collar 52.

The lever 48 is biased in an upward direction by a tension spring 56 connected at its lower end to the lever 48 at a position adjacent the pivot 49 and at its upper end to a radially extended projection 57 carried on the standard 36. A laterally extended catch member 58 (Fig. 1) secured to the lever 48 at a position adjacent the free end thereof, is adapted to be selectively engaged with one of the notches 59 formed in an upright curved lock bar 61 secured at its lower end to the base 34 and at its upper end to the standard 36. The lever 48, upon being depressed, is thus movable to an engaged position with a notch 59 and on release from the notch 59 is moved upwardly by the action of the tension spring 56, with the lever 48 being loosely arranged within the slots 47 in the standard 36 to provide sufficient transverse play of the lever 48 to disengage the catch 58 from the notches 59.

Arranged within the standard 36 is an axially extended clamp rod 62 formed with a laterally offset lower end portion 65 and pivotally connected at 63 with the foot lever 48. The upper portion of the clamp rod 62 is extended through a slot 64 in the table 37 and has a hook 66 formed at its upper end, for a purpose to appear later.

In mounting the tire and wheel assembly 21 on the device 20, the assembly 21 is arranged in a flat horizontal position on the table 37 with the bearing sleeve 41 extended upwardly through the central opening 26 in the wheel 23. With the assembly 21 in this horizontal position, the extensible outer portion 67 of a dowel unit 68, pivotally secured to ears 69 carried on the standard 36 below the table 37, is extended through one of the lug receiving apertures 27 in the wheel 23 to hold the wheel against rotation on the table 37. As best appears in Fig. 1, in this supported position of the assembly 21, the extension of the standard 36, namely, the bearing sleeve 41 and the post 44 project above the assembly 21.

The wheel 23 is centered relative to the standard 36 and in turn relative to the rotary post 44 by the provision of a wedge or clamp member 71 (Figs. 1, 7, 8, and 9) having a tubular hub portion 72 which is loosely received about the upper end of the bearing sleeve 41. A series of radially extended tapered wings 73 on the hub 72 extend within the central wheel opening 26 and engage the side 74 of the wheel body portion 24 at the opening 26.

With the wedge member 71 thus positioned, as shown in Fig. 1, the foot lever 48 is released from the notched lock bar 61 to permit the upward movement of the clamp rod 62 by the action of the tension spring 56. The hook 66 is then positioned over one of the wings 73 and the lever 48 is depressed to rigidly clamp the wheel 23 on the table 37 in a centered relation with the standard 36. By virtue of the floating collar 52, the lever 48 is prevented from being locked at a position providing for the location of the catch member 58 between adjacent notches 59. In other words, the clamp rod 62 can always be pulled downwardly to a firmly wedged position of the wedge member 71 within the wheel opening 26 by the action of the spring 53 to permit an upward movement of the collar 52.

The above described combination of elements, namely, the upright standard 36, the table 37, and the means for clamping the tire and wheel assembly 21 to the table, or the equivalents thereof, is well known in the art as evidenced by my prior Patent No. 2,505,172. Such combination of elements is therefore referred to hereinafter, both in the specification and the claims, as "tire and wheel supporting apparatus."

Provided on the standard 36, for moving the lower bead 29 inwardly of the rim 28 and out of engagement with the lower complementary rim portion 32, is a lever and shoe assembly, indicated generally at 76 (Figs. 1–6, inclusive). The assembly 76 includes a supporting arm 77 secured to a ring or bearing member 78 rotatably received on the tubular standard 36 and maintained against axial movement thereon by a pair of stop collars 79 secured to the standard 36 at opposite ends of the ring 78. The supporting arm 77 is extended radially outwardly from the standard 36 and has its free end portion 80 arranged below the table flange 38. Pivotally connected at 81 to the free end portion 80 of the arm 77 is the bifurcated end portion 82 of a lever or handle 83, which extends downwardly from the arm 77 in the inoperative position of the device 20 illustrated in Fig. 1.

Pivotally supported on the handle portion 82 is a shoe unit 84 which includes a shoe member 87 carried on a shank or supporting member 88. The upper end 85 of the shank 88 is secured to the rear side 95 of the shoe member 87 at a central portion 90 thereof. Brace members 91 extend between opposite sides of the member 88 and opposite end portions 92 of the shoe member 87.

The shoe member 87 is elongated and curved over its length in a direction to extend partially about the standard 36 and table 37. As best appears in Fig. 10 the curvature of the shoe 87 corresponds substantially to the curvature of the table 37. As a result, in the Fig. 1 position of the shoe member 87, substantially the entire shoe 87 is against the table flange 38, with only the extreme end portions 92 of the shoe 87 being spaced outwardly of the flange 38. In the assembly of the shoe unit 84 with the handle 83, the lower end of the shoe supporting member 88 is pivotally connected at 86 with the handle portion 82, with the pivot 86 being positioned radially outwardly of the standard 36 relative to the handle pivot 81.

The table 37 is of a size to receive wheels for fifteen and sixteen inch vehicle tires with a fifteen inch tire being illustrated in the drawing. As shown in Fig. 1, the diameter of the portion 28a of the wheel rim 28 positioned against the table 37 is substantially equal to the diameter of the table 37.

It is seen, therefore, that the handle 83 is pivotally supported at 81 on the arm 77 and that the shoe unit 84 is in turn pivotally supported on the handle 83. As a result of the relative arrangement of the pivots 81 and 86 and the guided engagement of the unit 84 with the table 37, therefore, on upward swinging movement of the handle 83, the shoe unit 84 is also moved upwardly.

In the operation of the device 20 to move the lower tire bead 29 out of engagement with the corresponding rim portion 32, assume that the tire and wheel assembly 21 is mounted on the table 37 as illustrated in Fig. 1 and that the device 20 is in the inoperative position shown in Fig. 1 with the handle 83 in a depending position extended downwardly from the handle pivot 81. The handle 83 is initially swung upwardly in a counterclockwise direction as viewed in Fig. 1 to move the shoe member 87 upwardly on the table flange 38 into engagement with the tire side wall 93 at a position adjacent the tire bead 29.

In the inoperative position of the device 20 (Fig. 1) the shoe member 87 and the supporting member 88 are substantially upright. However, by virtue of the arrangement of the pivot 86 for the shoe unit 84 at a position radially outwardly of the table flange 38, the shoe unit 84 is inclined inwardly toward the rim 28 at a progressively increasing angle on initial upward swinging movement of the handle 83. As a result of such inclination of the shoe member 87, the end portions 92 thereof are disposed at a slightly lower level than is the central portion 90 of the shoe 87 (Figs. 1 and 10). During the initial upward swinging movement of the handle 83 (Fig. 2), the pivot 86 is moved in an arc extending upwardly and outwardly about the handle pivot 81, whereby the inclination of the shoe member 87 is progressively increased until the pivot 86 is in a position in substantial horizontal alignment with the pivot 81. Thus, on upward pivotal movement of the handle 83, to move the shoe 87 into engagement with the tire side wall 93, the side wall 93 is initially engaged only by the central shoe portion 90. On continued upward swinging movement of the lever 83, the tire side wall 93 is engaged by the entire upper end of the shoe 87 which thus exerts a force on the side wall 93 tending to move the bead 29 inwardly on the rim 28. On final upward movement of the shoe 87, the bead 29 is rolled out of engagement with the corresponding rim portion 32 and over the rim projection 101 arranged inwardly of and adjacent to the tire bead 29.

During the upward pivotal movement of the shoe member 87, the shoe unit 84 is in continual guided engagement with the edge 102 of the table 37. In other words, on upward movement of the shoe member 87 out of guided engagement with the table 37, the shank 88 follows to a position in which the inner edge 89 thereof moves in guided engagement with the table edge 102. It can thus be seen that the table 37 and particularly the edge 102 thereof constitutes guide means for the shoe unit 84 for initially locating the shoe member 87 for engagement with the tire 22 and finally for insuring the desired path of travel for the shoe 87.

In the intermediate position of the shoe 87 illustrated in Figs. 2 and 5, the shoe pivot 86 is above and in substantial vertical alignment with the position of the pivot 86 in the inoperative position of the device 20 illustrated in Fig. 1. As a result during movement of the handle 83 from the inoperative position (Fig. 1) to the intermediate position (Fig. 2) the inclination of the shoe 87 relative to a vertical plane, is increased and the shoe 87 is moved inwardly of the wheel rim 28.

On further upward movement of the handle 83 from the position shown in Fig. 2, the pivot 86 for the shoe unit 84 is moved a progressively increasing distance inwardly of the rim 28 and very little upwardly relative to the table 37 since the pivot 86 is approaching the top of its arc about the pivot 81. By virtue of this travel of the pivot 86, the shoe supporting member 88 is rotated or rocked in a clockwise direction about the table edge 102 as a fulcrum. The end portions 92 of the shoe member 87 are thus moved upwardly relative to the central portion 90 so that in the final position of the shoe 87 illustrated in Fig. 3 the shoe portions 92 are approximately on a level with the portion 90.

As a result, the portions 92 act to move a substantial portion of the tire bead 29 out of engagement with the corresponding rim portion 32, and as best appears in Fig. 6, a large portion of the tire bead 29 is moved out of engagement with the tire rim portion 32. With this amount of the tire bead 29 thus broken, the balance of the tire bead 29 is readily movable by hand out of engagement with its corresponding rim portion 32.

However, in the event an unusually difficult bead removal operation is encountered, so that the remainder of the tire bead 29 is not readily manually movable out of engagement with its corresponding rim portions 32, the handle 83 is readily moved to its inoperative position illustrated in Fig. 1 and the entire lever and shoe assembly 76 is rotated about the standard 36, until the shoe 87 is opposite a section of the remaining portion of the bead to be removed. The above operation wherein the handle 83 is rotated in a counter-clockwise direction to move the shoe member 87 upwardly and initially inwardly of the rim 28 and finally outwardly of the rim 28 is then repeated to thereby move the entire bead 29 out of engagement with the corresponding rim portion 32.

It is seen, therefore, that by virtue of the pivotal support of the shoe unit 84 on the handle 83, and the guided engagement of the unit 84 with the table 37, the shoe 87 is moved upwardly on upward swinging movement of the handle 83 with this upward movement being initially inclined inwardly of the wheel and tire assembly 21, until the pivots 81 and 86 are in substantial horizontal alignment, and finally outwardly relative to the assembly 21. It is this movement of the shoe unit 84 and the engagement of shoe member 87 with the tire side wall 93 at a position adjacent the bead 29 that provides for the action of the shoe member 87 on the tire side wall 93 to roll the bead 29 out of engagement with the rim portion 32 with about half the bead 29 for the entire tire 22 being removed in a single operation of the handle 83.

Although the operation of the device 20 has been particularly described with respect to a fifteen inch tire, the operation is substantially identical for a sixteen inch tire. The shoe and lever assembly 76 is rotated about the standard 36 to a position in which the shoe member 87 rests against a guide strap 100 (Figs. 1 and 10) secured to the table flange 38. By so positioning the shoe member 87 prior to operation of the handle 83, engagement of the shoe 87 with the desired portion of the tire side wall 93 to roll the bead off the complementary rim portion, on operation of the handle 83, is assured. In other words, the strap 100 then operates as a guide means for the shoe unit 84.

The upper bead 31 is moved out of engagement with the rim portion 33, similarly to the lower bead 29 by the provision of a separate shoe and lever assembly 111 (Figs. 7, 8 and 9).

The assembly 111 includes a supporting arm 112 extended radially outwardly from a ring or bearing 113 rotatably received on the standard extension member 44. Pivotally connected at 114 to the free outer end of the arm 112 is the bifurcated end portion 116 of a handle or lever 117, which, as best appears in Fig. 7, in the inoperative position of the assembly 111 extends radially outwardly of the extension 44 in substantial alignment with the arm 112. A shoe unit 118, similar to the shoe unit 84 previously described, is pivotally connected at one of its ends at 119 to the lever portion 116 at a position outwardly of the pivotal connection 114 of the lever 117 on the arm 112. A curved tire engaging shoe 121, similar to the shoe 87 for the unit 84, is carried at the opposite end of the unit 118.

In the operation of the assembly 111 to move the bead 31 out of engagement with the rim portion 33, the shoe 121 is engaged with the tire side wall 122 at a position adjacent the upper edge 123 of the wheel rim 28 (Fig. 7), with the shoe 121 in guided engagement with the rim 23 at the edge portion 123, which functions as a locating and guide means for the shoe unit 118 as will clearly appear hereinafter. On downward pivotal movement of the handle 117, the shoe 121 is moved downwardly and inwardly of the wheel 23 with first the shoe 121 and then the edge 124 of the shoe supporting shank 126 in guided engagement with the rim edge portion 123. Such movement of the shoe 121 corresponds to the movement of the shoe unit 84 inwardly of the wheel 23 in guided engagement with the table 37 on operation of the handle 83. Also, the central portion 127 of the shoe 121 is moved downwardly ahead of the shoe end portions 128 by virtue of the inclined position of the shoe 121 relative to the horizontal wheel rim 23.

As best appears in Fig. 8, therefore, on downward movement of the handle 117 to a position in which the shoe pivot 119 is slightly below the handle pivot 114, a small portion of the tire bead 31 has been rolled out of engagement with its complementary rim portion 33. Manifestly, the bead 31 has also been moved across the adjacent rim projection 131 (Fig. 1). As shown in Figs. 8 and 13, in the intermediate position of the shoe 121, the tire side wall 122 is flattened at a position opposite the shoe 121, with the side wall 122 curving sharply upwardly, as indicated at 125, at the ends 128 of the shoe 121. On further downward pivotal movement of the handle 117 (Fig. 9) the shoe unit 118 is rotated or rocked about the rim edge 123 such that the shoe 121 is moved outwardly of the rim 28 to thereby move the shoe end portions 128 downwardly to the level of the central portion 127.

It is seen, therefore, that the operation of the lever and shoe assembly 111 for breaking the top bead 31 is substantially identical to the operation of the shoe and lever assembly 76 for breaking the lower bead 29, with the upper shoe unit 118 being guidably engaged with the rim edge 123 in the same manner that the shoe unit 87 is guidably engaged with the table 37. Likewise, in most cases a single operation of the assembly 111 is sufficient to move enough of the bead 31 out of engagement with the rim portion 33 to provide for a manual removal of the remaining portion of the bead 31.

As shown in Fig. 13, the tire side walls 93 and 122 are provided with small peripheral projections 131, formed during molding of the tire 22. In the operation of the upper bead breaking shoe 121, the shoe 121 is engaged with the side wall 122 at a position between the rim 28 and a projection 131. As a result, the frictional contact of the shoe 121 with a projection 131 precludes any outward slipping movement of the shoe 121 on the side wall 122. However, on some tires having particularly soft and flexible side walls and formed without the mold projection 131 shown in Fig. 13, there is a tendency for the shoe 121 to slip outwardly on the tire side wall 122.

For breaking the beads of such tires, the modified shoe members 141 and 142 illustrated in Figs. 11 and 12 are particularly useful. Either of the shoe members 141 and 142 is merely substituted or used in place of the shoe members 87 and 121 illustrated in Figs. 1–10, inclusive.

The shoe member 141 is identical with the shoe members 87 and 121 but includes in addition a rearwardly extended leg 143 secured to the rear side 144 of the shoe member 141 at a position adjacent the tire engaging edge 146 thereof. In the use of the shoe member 141, the leg 143 frictionally engaged the tire side wall 122 to positively preclude any outward slipping movement of the shoe member 141 on the side wall 122.

The modified shoe member 142 is provided with a pair of longitudinally spaced, rearwardly extended legs 147 which extend outwardly from opposite ends 148 of the shoe member 142. The legs 147 are positioned adjacent the lower tire engaging edge 149 of the shoe member 142 and are provided with end portions 151 curved in directions away from the shoe edge 149. Likewise, in the use of the shoe member 142, the legs 147 engage the tire side wall and act to preclude any outward slipping of the shoe member 142 on the side wall. The curved end portions 151 of the legs 147 conform generally to the shape of the tire side wall indicated at 125 in Fig. 8 to prevent any severe indentation of the side wall by the legs 147.

From the above description, it is seen that this invention provides a tire dismounting device 20 which is readily operable to roll the beads 29 and 31 for a tubeless tire 22 out of engagement with the complementary portions 32 and 33, respectively, of a rim 28 for the tire. It is to be understood, of course, that the device 20 is equally adapted to the usual pneumatic tires having tubes. The device 20 was described particularly with reference to a tubeless tire 22 since the device operates to easily roll the beads 29 and 31 over the rim projections 101 and 131, respectively, on the rim 28 for such tire 22 while other tire dismounting apparatus which operate on a prying principle encounter difficulty in moving the beads over corresponding rim projections. With the device 20, the usual tire beads are readily rolled off corresponding rim portions with a minimum amount of effort on the part of the operator of the device 20.

Although the invention has been described with respect to a preferred embodiment thereof, it is to be understood it is not to be so limited, since changes can be made therein which are within the full intended scope of this invention as defined by the appended claims.

I claim:

1. Tire dismounting apparatus comprising an upright standard, a horizontal tire and wheel rim supporting table mounted on said standard, a guide portion on said table, a supporting arm below said table mounted on and extended radially outwardly from said standard, a lever member pivotally supported on said arm at a position below said guide portion, a substantially horizontally disposed tire engaging shoe of a curved and elongated shape having a central portion and a pair of end portions, a shoe mounting member connected at one end to the convex side of said central portion and pivotally connected at its other end with said lever at a position below and spaced radially outwardly from the pivotal support of said lever, said mounting member being in an upright substantially parallel relation with said lever, when said lever is in an inoperative position, and with said mounting member having a straight edge lying in a vertical plane between said pivotal support and said pivotal connection, and said central portion having the concave side thereof resting against said guide portion, whereby said mounting member, on initial actuation of said lever, is moved upwardly into an inwardly inclined position so that the center portion of said shoe moves upwardly into engagement with said tire ahead of said end portions, and said straight edge, on a final upward movement of said shoe, engaging said guide portion to direct said shoe outwardly to bring said end portions substantially on a level with said central portion.

2. Tire dismounting apparatus comprising an upright standard, a vehicle tire and wheel rim assembly supporting table mounted on said standard, a support arm below said table mounted on and extended radially from said standard, a guide portion on said table located outwardly from the juncture of the tire bead and the complementary portion of a wheel rim of said assembly, a lever pivotally supported on said arm at a position below said guide portion so as to hang downwardly therefrom in an inoperative position, a shoe unit having a straight upright shank member, means pivotally connecting the lower end of said shank member with said lever at a position spaced radially outwardly from said lever pivotal support so that a straight edge of said shank is between said pivotal support and pivotal connection, and a curved and elongated tire engaging shoe member having a central portion and end portions for engaging said tire adjacent said juncture, the upper end of the side edges of said shank member, being secured to the convex side of said central portion so that the concave side of said central portion rests against said guide portion when the lever is in an inoperative position, said shank member, on initial actuation of said lever, being tilted inwardly toward said juncture so that the center portion of said shoe member moves upwardly ahead of said end portions to engage the tire adjacent said juncture, to break away a first portion of a tire bead from a complimentary rim portion at said juncture, and said shank side edge, on a final upward movement of said shoe member, engaging said guide portion to direct said shoe member outwardly to bring said end portions substantially on a level with said central portion to break additional portions of the tire bead away from complimentary rim portions.

References Cited in the file of this patent
UNITED STATES PATENTS

| 1,646,511 | Weaver et al. | Oct. 25, 1927 |
| 1,651,389 | Heineke | Dec. 6, 1927 |
| 1,742,590 | Frevogel | Jan. 7, 1930 |
| 2,413,010 | Teegarden | Dec. 24, 1946 |
| 2,523,979 | Weeks et al. | Sept. 26, 1950 |
| 2,545,157 | McCrary | Mar. 13, 1951 |
| 2,609,039 | Henderson | Sept. 2, 1952 |